United States Patent Office 3,366,713
Patented Jan. 30, 1968

3,366,713
CROTONIC ACID, 3 - HYDROXY - CIS, DIESTER OF UNSATURATED ALKYLENE, BIS(DIALKYL PHOSPHATE)
Juan G. Morales, Modesto, Calif., assignor to Shell Oil Company, New York, N.Y., a corporation of Delaware
No Drawing. Filed Nov. 27, 1964, Ser. No. 414,432
10 Claims. (Cl. 260—928)

ABSTRACT OF THE DISCLOSURE

Insecticidal bis-esters of crotonic acid phosphates such as crotonic acid, 3-hydroxy-, cis, 2-butynylene bis(ester), bis(dimethyl phosphate).

---

This invention relates to novel organophosphorus compounds which have been found to be effective for the control of insects.

It has been found that crotonates represented by the formula:

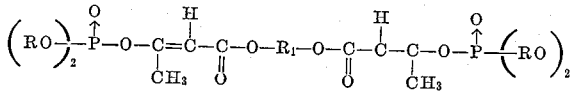

wherein R represents alkyl of one to four carbon atoms or haloalkyl of one to four carbon atoms and $R_1$ represents alkenylene or alkynylene of up to eight carbon atoms, are effective miticides and insecticides. When applied to crops at dosages which will effectively control mites and insects, the compounds of the invention are non-injurious to the plants so treated. This combination of a high order of effectiveness at low dosages and absence of phytotoxicity to the crop to be protected makes the crotonates of the invention attractive candidates in the field of plant protection.

The compounds of the invention, characterized by the attachment of an unsaturated moiety to the carbonyl function of the molecule, have surprising and unexpectedly high toxicity to lepidopterous larvae. The subject compounds are also highly useful for the control of phytophagous mites and mites of medical importance—especially those mites which transmit disease. In addition these crotonates are also toxic to several other species of economically important insects, including aphids.

In the crotonates of the invention, R suitably is either straight-chain or branched-chain alkyl or middle halogen-substituted alkyl (preferably mono-halogen-substituted) of one to four carbon atoms. $R_1$ suitably is an unsubstituted or mono (middle-halogen)-substituted alkenylene or alkynylene moiety of up to eight carbon atoms, which may be straight- or branched-chain, in which the unsaturation occurs between any two carbon atoms of the chain excepting the carbon atoms bonded to the oxygen atom of the oxy-carbonyl moiety. By "middle halogen" is meant chlorine and bromine.

Examples of this new class of crotonates include:

crotonic acid, 3-hydroxy-, cis, 2-butynylene bis(ester), bis(diethyl phosphate)
crotonic acid, 3-hydroxy-, cis, 2-butynylene bis(ester), bis(dipropyl phosphate)
crotonic acid, 3-hydroxy-, cis, 2-butynylene bis(ester), bis(dibutyl phosphate)
crotonic acid, 3-hydroxy-, cis, 2-butynylene bis(ester), bis(di(chloromethyl)phosphate)
crotonic acid, 3-hydroxy-, cis, 2-butynylene bis(ester), bis(di(bromoethyl)phosphate)
crotonic acid, 3-hydroxy-, cis, 2-butynylene bis(ester), bis(methyl chloromethyl phosphate)
crotonic acid, 3-hydroxy-, cis, 2-butenylene bis(ester), bis(diethyl phosphate)
crotonic acid, 3-hydroxy-, cis, 2-butenylene bis(ester), bis(dipropyl phosphate)
crotonic acid, 3-hydroxy-, cis, 2-butenylene bis(ester), bis(di(chloromethyl)phosphate)
crotonic acid, 3-hydroxy-, cis, 2-octynylene bis(ester), bis(diethyl phosphate)
crotonic acid, 3-hydroxy-, cis, 2-octynylene bis(ester), bis(dibutyl phosphate)
crotonic acid, 3-hydroxy-, cis, 2-octynylene bis(ester), bis(di(chloromethyl)phosphate)
crotonic acid, 3-hydroxy-, cis, diester with 2,7-dimethyl-3,5-octadiyne-2,7-diol, bis(diethyl phosphate)
crotonic acid, 3-hydroxy-, cis, diester with 2,7-dimethyl-3,5-octadiyne-2,7-diol, bis(di(chloromethyl)phosphate)
crotonic acid, 3-hydroxy-, cis, 2-octenylene bis(ester), bis(dimethyl phosphate)
crotonic acid, 3-hydroxy-, cis, 2-octenylene bis(ester), bis(diethyl phosphate)
crotonic acid, 3-hydroxy-, cis, 2-octenylene bis(ester), bis(dibutyl phosphate)
crotonic acid, 3-hydroxy-, cis, 3-chloro, 2-butylene bis(ester), bis(dimethyl phosphate)
crotonic acid, 3-hydroxy-, cis, 3-chloro, 2-butenylene bis(ester), bis(dimethyl phosphate)
crotonic acid, 3-hydroxy-, cis, 3-bromo, 2-octynylene bis(ester), bis(dimethyl phosphate)

The compounds of the invention wherein R is methyl are to be preferred because of their outstandingly high insecticidal activity.

Preferred because of their particular insecticidal properties are those bis esters of the invention wherein $R_1$ represents butenylene, butynylene or octynylene. Exemplary of such crotonic acid diesters are crotonic acid, 3-hydroxy-, cis, 2-butynylene bis(ester), bis(dimethyl phosphate), crotonic acid, 3-hydroxy-, cis, 2-butenylene bis(ester), bis(dimethyl phosphate) and crotonic acid, 3-hydroxy-, cis diester with 2,7-dimethyl-3,5-octadiyne-2,7-diol, bis(dimethyl phosphate).

The alkenyl diesters of the invention are conveniently prepared by a reaction between alkenylic diols and dialkyl phosphates of 3-hydroxy crotonyl halides in the presence of an acid catalyst to yield the reaction product according to the equation:

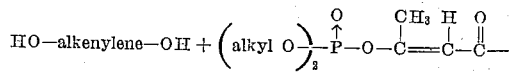 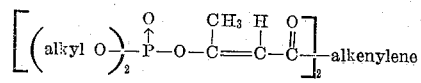

Preparation of such dialkyl phosphates of 3-hydroxycrotonyl halides is disclosed in copending application Ser. No. 441,861, filed Mar. 22, 1965.

The reaction is started at temperatures slightly above room temperature (30–40° C.). The addition of the more heat is made slowly to avoid any undue temperature rise to this mildly exothermic reaction. The desired temperature range of the reaction is between 70–100° C.

The alkynyl compounds of the invention may be conveniently prepared by the addition of a diol containing an alkynyl group to the halide of an appropriate crotonic acid according to the schematic equation:

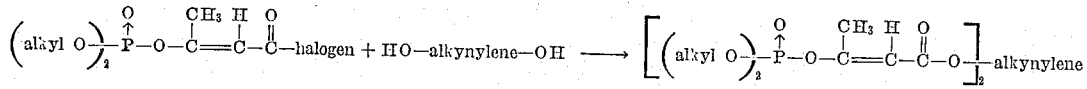

The following examples are offered to illustrate how certain select compounds of the invention are synthesized and to illustrate their activity to some species of mites and insects. These examples are not to be construed as in any way limiting the scope of the invention. In the following examples, the parts given are by weight unless otherwise noted.

EXAMPLE I (A) *Preparation of 3-(dimethoxyphosphinyloxy) crotonic acid*

942 parts of technical (92%) alpha-methylbenzyl ester of 3-(dimethoxyphosphinyloxy)crotonic acid was placed in an autoclave, together with 40 parts of palladized charcoal, 15 parts by volume of glacial acetic acid and 2000 parts by volume of methanol. The reactor was pressurized with hydrogen and the mixture stirred for 4 hours at a temperature of about 35° C. The reactor then was vented, 25 parts of fresh palladized charcoal were added, and repressurized with hydrogen and the mixture stirred for an additional 8.5 hours at about 25–35° C. The catalyst then was filtered off, and the methanol stripped off at 0° C., 0.45 Torr, then at 65° C., 0.4 Torr. The product then was recrystallized from anhydrous ether at −65° C., then was stripped to 35° C., 0.5 Torr, to give 3 - (dimethoxyphosphinyloxy)crotonic acid (equivalent weight 209 grams-equiv.; calculated for $PO_6C_6H_{11}$:210).

(B) *Preparation of 3-(dimethoxyphosphinyloxy) crotonyl chloride*

400 parts of 3-(dimethoxyphosphinyloxy)crotonic acid, prepared as in A, was dissolved in 400 parts by volume of methylene chloride, 261 parts of thionyl chloride in 260 parts by volume of methylene chloride was added dropwise with stirring over a 45 minute period, the temperature being maintained at 38–40° C.; the mixture then was refluxed (40° C.) for an additional hour. The mixture was then stripped to 45° C. at 0.2 Torr to give 424.5 parts of a product analyzing 93% 3-(dimethoxyphosphinyloxy)crotonyl chloride, identified by elemental, infra-red spectrum and nuclear magnetic resonance analyses and by equivalent weight.

EXAMPLE II

*Preparation of crotonic acid, 3-hydroxy-, cis, 2-butynylene bis(ester), bis(dimethyl phosphate)*

4.3 parts of 1,4-butynediol were added to 25.8 parts of 3 - (dimethoxyphosphinyloxy)crotonyl chloride (89% pure), as prepared in Example I, and 50 parts of carbon tetrachloride. The reaction mixture was heated to reflux for approximately two hours, allowed to stand overnight then stripped in a rotary evaporator at 65° C. giving 25 parts of the bis ester in 72.5% yield. The product was further purified by dilution in carbon tetrachloride, washed with water, and saturated sodium carbonate solution, then dried over magnesium sulfate, filtered and stripped over the rotary evaporator. The identity of the compound was confirmed by infra-red spectrum analysis and by elemental analysis: percent by weight.

Calculated for $P_2O_{12}C_{16}H_{24}$: P, 13.2; Cl, 0. Found: P, 12.9; Cl, <0.1.

EXAMPLE III

In a similar manner as given in Example II, the acid chloride of Example I was reacted with 1,4-butenediol to give crotonic acid, 3-hydroxy-, cis, 2-butenylene bis(ester), bis(dimethyl phosphate) in 89% yield. The structure of the diester was confirmed by elemental analysis: percent by weight.

Calculated for $P_2O_{12}C_{16}H_{26}$: P, 12.9; Cl, 0. Found: P, 12.4; Cl, 0.57.

EXAMPLE IV

In a manner similar to that of Example II, the acid chloride of Example I was reacted with 2,7-dimethyl-3,5-octadiyne-2,7-diol to give crotonic acid, 3-hydroxy-, cis, diester with 2,7-dimethyl-3,5-octadiyne-2,7-diol in 73% yield, the structure of which was confirmed by elemental analysis: percent by weight.

Calculated for $P_2O_{12}C_{22}H_{32}$: P, 11.3; Cl, 0. Found: P, 11.0; Cl, 0.45.

EXAMPLE V

*Evaluation of subject bis crotonates on mites and aphids*

The compounds were tested against the two-spotted spider mite (*Tetranychus telarius*) and the pea aphid (*Macrosiphum pisi*) by spraying infected plants with a series of concentrations and determining the $LC_{50}$ (the concentration required to kill 50%) in each case. The tests were replicated and run on three separate days and the $LC_{50}$'s were averaged and are presented in Table I.

TABLE I.—TOXICITY OF BIS CROTONATES ON MITES AND APHIDS $$(CH_3O)_2-\overset{O}{\overset{\uparrow}{P}}-O-\overset{H}{\underset{CH_3}{C}}=\overset{}{\underset{O}{C}}-\overset{}{\underset{}{C}}-O-R-O-\overset{}{\underset{O}{C}}-\overset{H}{\underset{CH_3}{C}}=\overset{}{\underset{}{C}}-O-\overset{O}{\overset{\uparrow}{P}}-(OCH_3)_2$$

| R | $LC_{50}$, Conc., Percent/w. ||
|---|---|---|
|   | 2-spotted spider mite | Pea aphid |
| —CH₂C≡CCH₂— | 0.0057 | 0.00039 |
| —CH₂HC=CHCH₂— | .013 | .00024 |
| —C(CH₃)₂—C≡C—C(CH₃)₂— | .011 | .0027 |

EXAMPLE VI

*Toxicity of bis crotonates to corn earworms*

The toxicity of the subject compounds was tested against corn earworms were tested by placing uniform size worms upon freshly sprayed plants. The results were presented in Table II in terms of the lethal concentration required to kill 50% of the insects ($LC_{50}$) and represent the average of several determinations.

TABLE II.—TOXICITY OF BIS CROTONATES ON CORN EARWORMS $$(CH_3O)_2-\overset{O}{\overset{\uparrow}{P}}-O-\overset{H}{\underset{CH_3}{C}}=\overset{}{\underset{O}{C}}-\overset{}{\underset{}{C}}-O-R-O-\overset{}{\underset{O}{C}}-\overset{H}{\underset{CH_3}{C}}=\overset{}{\underset{}{C}}-O-\overset{O}{\overset{\uparrow}{P}}-(OCH_3)_2$$

| R | $LC_{50}$, Conc., Percent/w. |
|---|---|
| —CH₂C≡CCH₂— | 0.0037 |
| —CH₂HC=CHCH₂— | .0124 |
| —C(CH₃)₂—C≡C—C(CH₃)₂— | .041 |

It is thus evident that the compounds of this invention are effective insecticides, the term "insect" including not only the members of the class Insecta, but also related or similar non-vertebrate animal organisms belonging to the allied classes of arthropods and including mites, ticks, spiders, wood lice, and the like.

The compounds of this invention can be employed for insecticidal purposes by the use of any of the methods which are conventionally employed in that art. For example, the compounds can either be sprayed or otherwise applied in the form of a solution or dispersion, or they can be absorbed on an inert, finely-divided solid and applied as a dust. Useful solutions for application by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl acid sulfonates, long-chain alkyl sulfonates, phenol ethylene oxide condensates, ammonium salts, and the like. These solutions can be employed as such, or, more preferably, they can be dispersed or emulsified in water and the resulting aqueous dispersion or emulsion applied as a spray. Solid carrier materials which can be employed include talc, bentonite, lime gypsum, pyrophyllite and similar inert solid diluents. If desired, the compounds of the present invention can be employed as an aerosol, as by dispersing the same into the atmosphere by means of a compressed gas.

The concentration of the compounds to be used with the above carriers is dependent upon many factors, including the carrier employed, the method and conditions of application, and the insect species to be controlled, a proper consideration and resolution of these factors being within the skill of those versed in the insecticide art. In general, however, the compounds of this invention are effective in concentrations of from about 0.01% to 0.5% based upon the total weight of the composition, though under some circumstances as little as about 0.00001% or as much as 2% or even more of the compound can be employed with good results from an insecticidal standpoint. Concentrates suitable for sale for dilution in the field may contain as much as 25–50% by weight, or even more, of the insecticide.

When employed as insecticides, the compounds of this invention can be employed either as the sole toxic ingredient of the insecticidal composition or can be employed in conjunction with other insecticidally-active materials. Representative insecticides of this latter class include the naturally-occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl-p-nitrophenyl thiophosphate, dimethyl 2,2-dichlorovinyl phosphate, 1,2-dibromo-2,2-dichloroethyl dimethyl phosphate, azobenzene, and the various compounds of arsenic, lead and/or fluorine. The crotonates of the invention may also be employed with other pesticides such as fungicides or nematocides, or may be used along with fertilizers, plant hormones, and the like.

I claim as my invention:

1. A compound of the formula

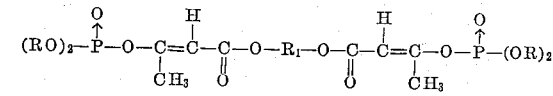

wherein R is alkyl of 1–4 carbon atoms or middle halogen-substituted alkyl of 1–4 carbon atoms, and $R_1$ is a divalent organic radical of up to 8 carbons selected from the group consisting of alkenylene, alkynylene, mono-middle halogen-substituted alkenylene and mono-middle halogen-substituted alkynylene, the unsaturation occurring between any two carbon atoms of said organic radical except the carbon atom bonded to the oxygen atom of the oxycarbonyl moiety.

2. The compound of claim 1 wherein R is alkyl of 1–4 carbon atoms.
3. The compound of claim 2 wherein $R_1$ is alkynylene of up to 8 carbon atoms.
4. The compound of claim 2 wherein $R_1$ is alkenylene of up to 8 carbon atoms.
5. The compound of claim 1 wherein R is methyl.
6. The compound of claim 3 wherein R is methyl.
7. The compound of claim 4 wherein R is methyl.
8. Crotonic acid, 3-hydroxy-, cis, 2-butynylene bis-(ester), bis(dimethyl phosphate).
9. Crotonic acid, 3-hydroxy-, cis, 2-butenylene bis-(ester), bis(dimethyl phosphate).
10. Crotonic acid, 3-hydroxy-, cis, diester with 2,7-dimethyl - 3,5 - octadiyne - 2,7 - diol, bis(dimethyl phosphate).

References Cited

UNITED STATES PATENTS 3,157,686  11/1964  Pohlemann et al. _____ 260—928

CHARLES B. PARKER, *Primary Examiner.*

A. H. SUTTO, *Assistant Examiner.*